United States Patent
Duquesne et al.

(10) Patent No.: US 9,788,491 B2
(45) Date of Patent: Oct. 17, 2017

(54) ROTOR HOUSING ASSEMBLY FOR A HARVESTER

(71) Applicant: CNH INDUSTRIAL AMERICA LLC, New Holland, PA (US)

(72) Inventors: Frank R. G. Duquesne, Zwevegem (BE); Philip Maenhout, Waterland-Oudeman (BE); Bart M. A. Missotten, Herent (BE); Johan A. Van Der Haegen, Gavere (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/772,298

(22) PCT Filed: Mar. 6, 2014

(86) PCT No.: PCT/EP2014/054376
§ 371 (c)(1),
(2) Date: Sep. 2, 2015

(87) PCT Pub. No.: WO2014/135648
PCT Pub. Date: Sep. 12, 2014

(65) Prior Publication Data
US 2016/0000009 A1 Jan. 7, 2016

(30) Foreign Application Priority Data
Mar. 7, 2013 (BE) .................................. 2013/0149

(51) Int. Cl.
*A01F 7/06* (2006.01)
*B02B 3/06* (2006.01)
*A01F 12/18* (2006.01)
*A01D 41/00* (2006.01)

(52) U.S. Cl.
CPC .............. *A01F 12/18* (2013.01); *A01D 41/00* (2013.01); *A01F 7/06* (2013.01); *A01F 7/067* (2013.01)

(58) Field of Classification Search
CPC ............. A01F 7/067; A01F 12/24; A01F 7/06
USPC ......................................... 460/99, 107, 109
See application file for complete search history.

(56) References Cited

U.S. PATENT DOCUMENTS

| | | |
|---|---|---|
| 4,244,380 A | 1/1981 | DePauw et al. |
| 4,258,726 A | 3/1981 | Glaser et al. |
| RE31,257 E * | 5/1983 | Glaser .................... A01F 12/24 460/80 |

(Continued)

*Primary Examiner* — Árpád Fábián-Kovács
(74) *Attorney, Agent, or Firm* — Peter K. Zacharias; Patirck M. Sheldrake (57) ABSTRACT

A rotor housing assembly for a harvester has at least one cover plate forming part of a generally cylindrical shaped rotor housing, a central longitudinal axis, and an inner surface, which, when mounted, faces the central longitudinal axis and has a first radius, and one or more rotatable vanes which each are rotatably mounted on an inner surface of the cover plate facing the central longitudinal axis at a rotation point. The one or more rotatable vanes have a contact surface with the inner surface. The contact surface has a second radius that is larger than the first radius of the cover plate. The inner surface of the top cover plate, per rotatable vane, has a symmetrically curved shape such that, during a rotation of the respective vane, the contact surface of the vane with the inner surface of the cover plate substantially follows the shape of the inner surface.

20 Claims, 7 Drawing Sheets

(56) References Cited

U.S. PATENT DOCUMENTS

| | | | |
|---|---|---|---|
| 4,611,605 A * | 9/1986 | Hall | A01F 7/06 460/80 |
| 4,739,773 A * | 4/1988 | West | A01F 12/442 460/113 |
| 5,078,646 A | 1/1992 | Claas et al. | |
| 5,334,093 A | 8/1994 | Jensen et al. | |
| 5,344,367 A * | 9/1994 | Gerber | A01F 12/10 460/68 |
| 5,445,563 A | 8/1995 | Stickler et al. | |
| 5,688,170 A * | 11/1997 | Pfeiffer | A01F 7/06 460/69 |
| 6,152,820 A * | 11/2000 | Heidjann | A01F 12/40 460/112 |
| 7,473,170 B2 * | 1/2009 | McKee | A01F 7/067 460/109 |
| 7,682,236 B2 * | 3/2010 | Buermann | A01F 7/067 460/109 |
| 8,540,559 B1 * | 9/2013 | Flickinger | A01F 7/067 460/69 |
| 8,926,415 B2 * | 1/2015 | Farley | A01F 7/067 460/107 |
| 9,282,696 B2 * | 3/2016 | Regier | A01F 12/28 |
| 2008/0058040 A1 | 3/2008 | Buermann et al. | |
| 2008/0207287 A1 | 8/2008 | McKee et al. | |
| 2009/0111547 A1 * | 4/2009 | Pope | A01F 7/067 460/80 |
| 2009/0143123 A1 | 6/2009 | Pope et al. | |
| 2010/0093413 A1 | 4/2010 | Pope et al. | |
| 2011/0223979 A1 * | 9/2011 | Bussmann | A01F 7/067 460/80 |
| 2011/0320087 A1 | 12/2011 | Farley et al. | |
| 2012/0047861 A1 | 3/2012 | Murray et al. | |
| 2013/0137492 A1 * | 5/2013 | Biggerstaff | A01F 12/28 460/62 |

* cited by examiner

ROTOR HOUSING ASSEMBLY FOR A HARVESTER

This application is the US National Stage filing of International Application Serial No. PCT/EP2014/054376 filed on Mar. 6, 2014 which claims priority to Belgian Application BE2013/0149 filed Mar. 7, 2013, each of which is incorporated herein by reference in its entirety.

FIELD OF THE INVENTION

The present invention relates to a rotor housing assembly for a harvester, comprising at least one cover plate having a generally curved shape, forming part of a generally cylindrical shaped rotor housing, a central longitudinal axis, and comprising an inner surface, which, when mounted, faces the central longitudinal axis and has a first radius, and a vane system comprising one or more rotatable vanes which each are rotatably mounted on the inner surface of the cover plate at a rotation point, the one or more rotatable vanes comprising a contact surface with the inner surface of the cover plate, the contact surface having a second radius being larger than the first radius.

BACKGROUND OF THE INVENTION

Agricultural harvesters such as combine and forage harvesters usually have one or two large rotors for threshing and separating the harvested crop material. In axial flow harvester, the rotors are arranged along the longitudinal axis of the harvester. In such axial flow harvesters, the crop material is subjected to a much longer threshing and separation cycle than in conventional harvesters and therefore, the efficiency of the axial flow harvesters is greater. A high separation degree is reached and a reduction of the grain loss is obtained.

The rotors of harvesters are provided with an infeed section, also called charging or inlet section, for receiving harvested crop material that was harvested from the field, a threshing section for threshing and separating grain out of the threshed mixture, a separating section for freeing remaining grain trapped in the threshed crop material received from the threshing section and an outlet section or discharge section for discharging the discardable part of the crop material.

It is known to a man skilled in the art to provide a housing for receiving a threshing and separating rotor with, secured to the inside of the housing, numerous helical guide vanes, also called bars or discharge flights, that are arranged underneath the cover element of the rotor housing. It is known that these vanes have a big impact on the transportation of the harvested crop material in the rotors in that way that the residence time of the crop material in the separating section is a function of the inclination of the vanes, that is, the angle of inclination, also called the pitch angle, between the vanes and the radius of the rotor.

Varying crop conditions within a field such as population and yield, moisture content, combined with atmospheric conditions such as humidity do have a big impact on the harvesting process. Operating parameters or settings are made during the harvesting process to accommodate with the conditions to optimize the processes such as, but not restricted to, threshing rotor speed and concave gap (adaptable distance between a perforated concave region of the threshing casing and the rotating rotor contained therein). Various inputs are used by the operator to optimize the settings in the given crop type and condition such as grain loss, grain sample, power consumption and the like.

The position of the vanes controlling the transportation of the harvested crop material through the axial rotor(s) is a very good way to anticipate on these harvesting conditions to search for the best fuel efficiency, reduced losses of wheat, beans or grains, straw quality, etc, also taking into care other factors such as grain cracking and other damage to the wheat, beans, grain, etc. and losses thereof. It is therefore known to make the vanes adjustable in order to vary the rate of axial progression of the harvested crop material through the separator so as to control the efficiency of threshing and separating. A smaller vane pitch angle setting will reduce in the rearward speed of the flow of the crop material and will typically result in the crop material flowing in a correspondingly steeper or tighter helical path through that region of the threshing cage, and thus greater dwell time in the threshing part of the rotor for threshing and separating. A larger vane pitch angle will increase in the rearward speed of the flow of the crop material and will result in crop material flow at a less steep or looser helix and less dwell time, threshing and separating. Small grain crops such as wheat and rice do not have to remain in the separating zone as long as corn, so it is desirable when smaller grains are being threshed to have a larger pitch angle for the vanes than when threshing for example corn.

A first known possibility for adjusting these vanes is that the operator manually adjusts them. The disadvantage thereof is that the operator has to leave the cabin and wrench for about 20 minutes to change the position of the vanes. Furthermore, the space between the grain tank and the rotor is not easily accessible and therefore the vanes are only changed in case of big issues as for instance losses of power. The combine harvester consequently is not optimally used in terms of setting resulting in less efficiency and productivity.

A second possibility is a remote control for the vane adjustment which will allow adjustment "on the go".

Already systems are known that allow vanes to be changed from the cabin but only when the rotor is standing still. This does not allow adjustment of the combine harvester on the go.

In US 2011/0320087, a system is disclosed for remote control of an adjustable threshing cage vane, including while the threshing system is operating, utilizing an actuator in connection with an at least one vane and remotely controllable for adjustably varying the position thereof within the cage for altering the path of the flow of the crop material therethrough.

In US 2010/0093413, all of the adjustable vanes are ganged together and moved together. A mechanism is provided to swing the adjustable vanes from a position corresponding to the normal helical path of the fixed vanes to a bypass position wherein crop flow through the adjustable vanes will skip one or more passes between the fixed vanes on the next pass through the fixed vanes.

A problem that arises with the adjustment of the vanes is that the vanes seal against a cylindrically formed cover and thus have a certain curvature. Consequently, in order to change in position relative to this cylindrically formed cover for quicker or slower transportation speed of the crop material throughout the rotors, the radius of the vanes needs to change. As a consequence, either the vanes or the cover has to be deformed. A first disadvantage thereof is that there is a risk that the vanes do not connect against the cylindrically formed cover, and thus gaps between the vanes and the cover occur which can become clogged because dirt can get stuck in these gaps through which it is more difficult or even impossible to move the vanes without these gaps previously being cleaned. A second disadvantage thereof is that this deformation unwillingly can significantly change the material flow characteristics for this rotor section.

Shortening the vanes in order to reduce deformation is helpful, but the effect is then less on the transportation of the crop material throughout the rotors.

In US 2010/0093413 as already cited above, in order to solve the abovementioned problem, an adjustable vane system for an axial-flow, rotary combine housing is described, wherein this housing incorporates at least one flat wall section as part of the otherwise cylindrical or oblong, curved housing cover, and adjustable vanes having flat bases that are angularly adjusted on the surface of the flat wall section. The housing therewith includes fixed vanes on a curved portion of the housing cover that have lead ends, in a direction of circumferential crop movement, substantially in registry with trailing ends of the adjustable vanes. The adjustable vanes include pivot connections near the trailing ends and swing connections near the lead ends of the adjustable vanes.

A first disadvantage thereof is that the length of straight vanes is very small and the impact on the transportation of the crop material throughout the rotors consequently is also smaller. A second disadvantage thereof is that the fixed and the adjustable vanes do not form a continuous curve anymore and form gaps between these vanes into which crop material can get clogged.

There consequently exists the need to provide a rotor housing assembly for a harvester according to the preamble of the first claim, wherein the curvature radius of the vanes does not have to be changed when the transportation speed of the crop material through the rotors has to be changed and thus the operating characteristics of the axial flow harvester are not adversely affected.

SUMMARY OF THE INVENTION

According to a first aspect of the invention, a rotor housing assembly for a harvester is provided, comprising at least one cover plate having a generally curved shape, forming part of a generally cylindrical shaped rotor housing, a central longitudinal axis, and comprising an inner surface, which, when mounted, faces the central longitudinal axis and has a first radius, and a vane system comprising one or more rotatable vanes which each are rotatably mounted on the inner surface of the cover plate at a rotation point, the one or more movable vanes having a contact surface with the inner surface of the cover plate, the contact surface having a second radius being larger than the first radius, wherein the inner surface of the cover plate, per rotatable vane, comprises a symmetrically curved shape being such that, during rotation of the respective vane, the contact surface of the vane with the inner surface of the cover plate substantially follows the shape and remains in contact with the inner surface of the cover plate.

Such a rotor housing assembly has the advantage that the movement of the one or more associated vanes is accommodated. The vanes in this way seal properly against the inner surface of the cover plate through which no gaps that can become clogged are created between the vane(s) and the inner surface of the cover plate and the vane(s) can be moved without buckling or distortion of the vanes and/or the cover plate. Consequently, a more durable mechanism is obtained resulting in a better setting of the harvester with less effort of the operator, leading to a higher productivity and efficiency.

The symmetrically curved shape preferably is a paraboloidal, ellipsoidal or spherical shape, the latter one being the most preferred.

In a preferred embodiment of a rotor housing assembly according to the invention, the one or more vanes are rotatable around a rotation axis through the rotation point, and, when viewed in a direction along the rotation axis, the one or more vanes are rotatably mounted between a first position in which the one or more vanes form a first angle with respect to a transverse plane through the rotation point and that is transverse on the central longitudinal axis, and a second position in which the one or more vanes form a second angle with respect to the transverse plane, and wherein the symmetrically curved shape at each angle that is situated between the first and second angle has a radius being equal to the second radius of contact surface of the one or more vanes.

In an advantageous embodiment of a rotor housing assembly according to the invention, the rotor housing assembly is arranged to allow flow of crop material there through, wherein each of the vanes comprises an upstream end coming last into contact with the flow of crop material, and the cover plate comprises at least one longitudinally extending side on the side of the cover plate where the upstream end of the vane(s) is situated, wherein, the symmetrically curved shape comprises a transition zone having a flat surface and starting near the upstream end of the respective vane and ending at the longitudinally extending side of the top cover.

In order to prevent obstructions in the flow of the crop material, the transition zone has the form of a semi-circular disk. The one or more vanes are shorter at this side.

In order to reinforce the symmetrically curved shape(s) against the pressure of the flowing crop material flying against the symmetrically curved shape(s) and consequently to prevent deformation as a consequence thereof, the cover has an outer generally cylindrical surface, wherein on the outer surface one or more reinforcement ribs are arranged between one or more of the symmetrically curved shapes.

In a favourable embodiment of a rotor housing assembly according to the invention, the cover plate is a top cover plate, and the rotor housing furthermore comprises a generally curved bottom cover plate forming part of a generally cylindrical shaped rotor housing and comprising an inner surface having a third radius, wherein, when mounted, the top cover plate and the bottom cover plate abut against each other, and wherein where the cover plates abut, the radius of the inner surface of the cover plate coming first into contact with the flowing crop material is smaller than the radius of the inner surface of the cover plate coming last into contact with the flowing crop material.

This prevents that the gap which is formed at the place where the top cover plate and the bottom cover plate abut gets clogged by crop material.

In a preferred rotor housing assembly according to the invention, one or more of the vanes are connected to one or more movable linkage bars by means of one or more connection elements. The connection elements preferably are situated at at least one of the longitudinal sides of the cover plate.

In a preferred embodiment of a rotor housing assembly according to the invention, the one or more releasable connection elements comprise a tearing system that is configured to exercise a tearing force onto the one or more vanes to tear the one or more vanes against the inner surface of the cover plate.

In an advantageous embodiment of a rotor housing assembly according to the invention, each of the one or more connection elements are movable in a corresponding slot, each of the slots comprising a wall sloping outwardly from the outer surface towards the inner surface of the cover plate.

In a possible preferred rotor housing assembly according to the invention, a first set of vanes are connected to a first linkage bar and a second set of vanes are connected to a second linkage bar, the first and second linkage bar being connected to one another by means of a coupling piece in order to allow to vary the first positions of the first and second set of vanes with respect to each other.

In an advantageous rotor housing assembly according to the invention, the one or more linkage bars are connected to one or more actuators which are adapted to move the linkage bar(s).

In a more advantageous rotor housing assembly according to the invention, the actuator(s) is (are) hydraulic or electric.

In a preferred embodiment of a rotor housing assembly according to the invention, between the cover plate and the one or more actuators, a force sensor is provided that is arranged to measure the load on the one or more vanes.

In a favourable embodiment of a rotor housing assembly according to the invention, the rotor housing assembly comprises a controller adapted to measure the effect of the position of the one or more vanes on fuel consumption, rotor and sieve losses, programmed to set the position of the vane(s) in optimal position on the go in function of the harvesting conditions.

According to a second aspect of the invention, a cover plate is provided for use in a rotor housing assembly according to the invention as described above.

According to a third aspect of the invention, a harvester is provided comprising a rotor housing assembly according to the invention as described above.

In a preferred embodiment of a harvester according to the invention, the harvester comprises one or more knobs or one or more touch screens to remotely control the one or more actuator(s).

The harvester preferably is an axial flow type harvester. However, the present invention can also be applied to any type of harvesters that comprise a rotor housing assembly according to the preamble of the first claim.

DETAILED DESCRIPTION OF EMBODIMENT(S)

It is remarked that within this specification, for convenience, the terms "grain" and "straw" are used principally as it is to be understood that these terms are not intended to be limiting. "Grain" thus refers to that part of the crop material which is threshed and separated from the discardable part of the crop material which is referred to as "straw". Also the terms "forward", "rearward", "left" and "right", when used in connection with the harvester and/or components thereof are determined with reference to the direction of forward operative travel of the harvester, but again, they should not be construed as limiting. The terms "longitudinal" and "transverse" are determined with reference to the fore-and-aft direction of the harvester and are equally not to be construed as limiting.

Figure 1:
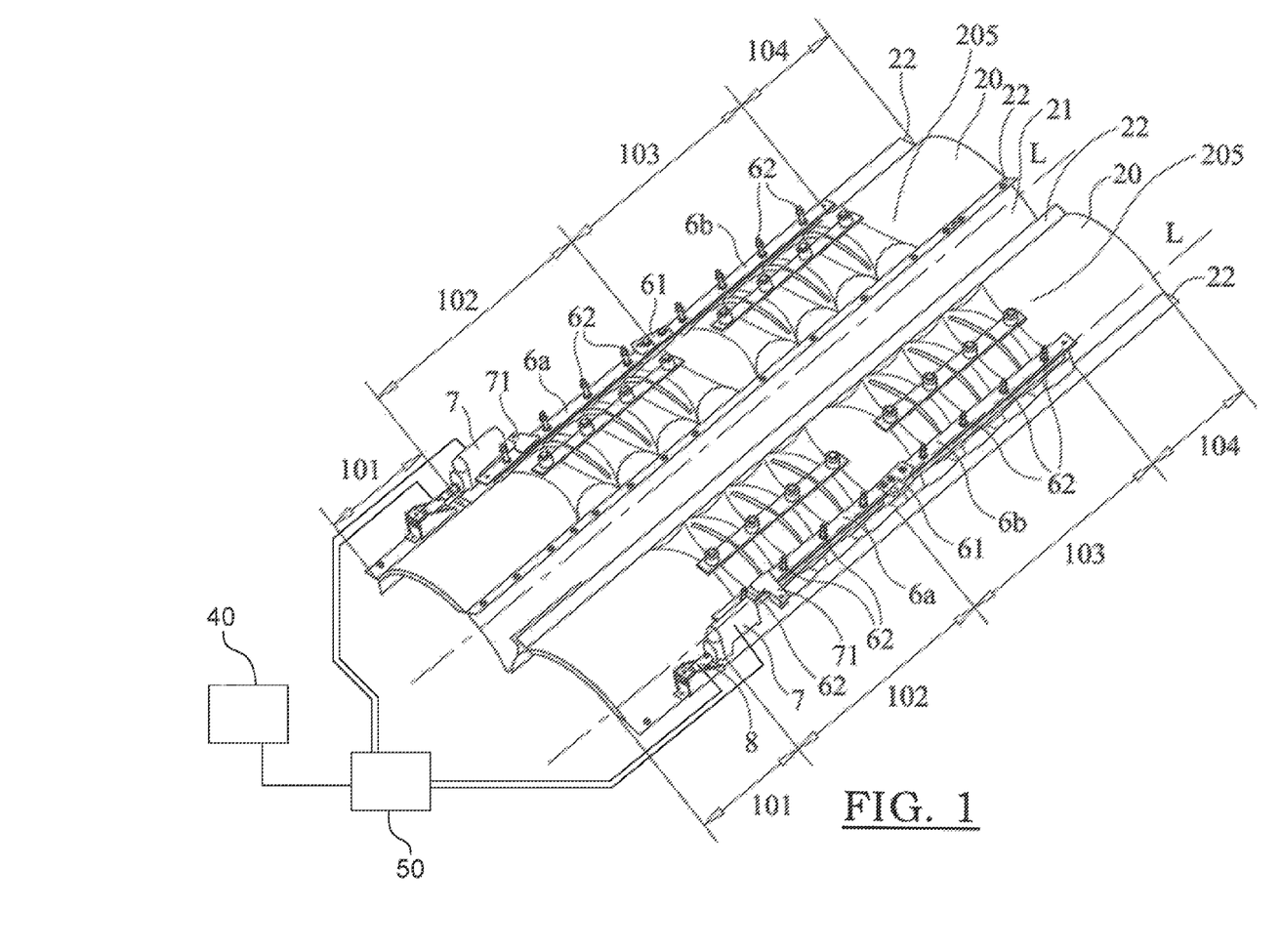
FIG. 1 illustrates a perspective top view of two side-by-side rotor housing top cover plates with electrically adjustable vanes of an axial flow rotor housing assembly according to the invention.
Figure 2:
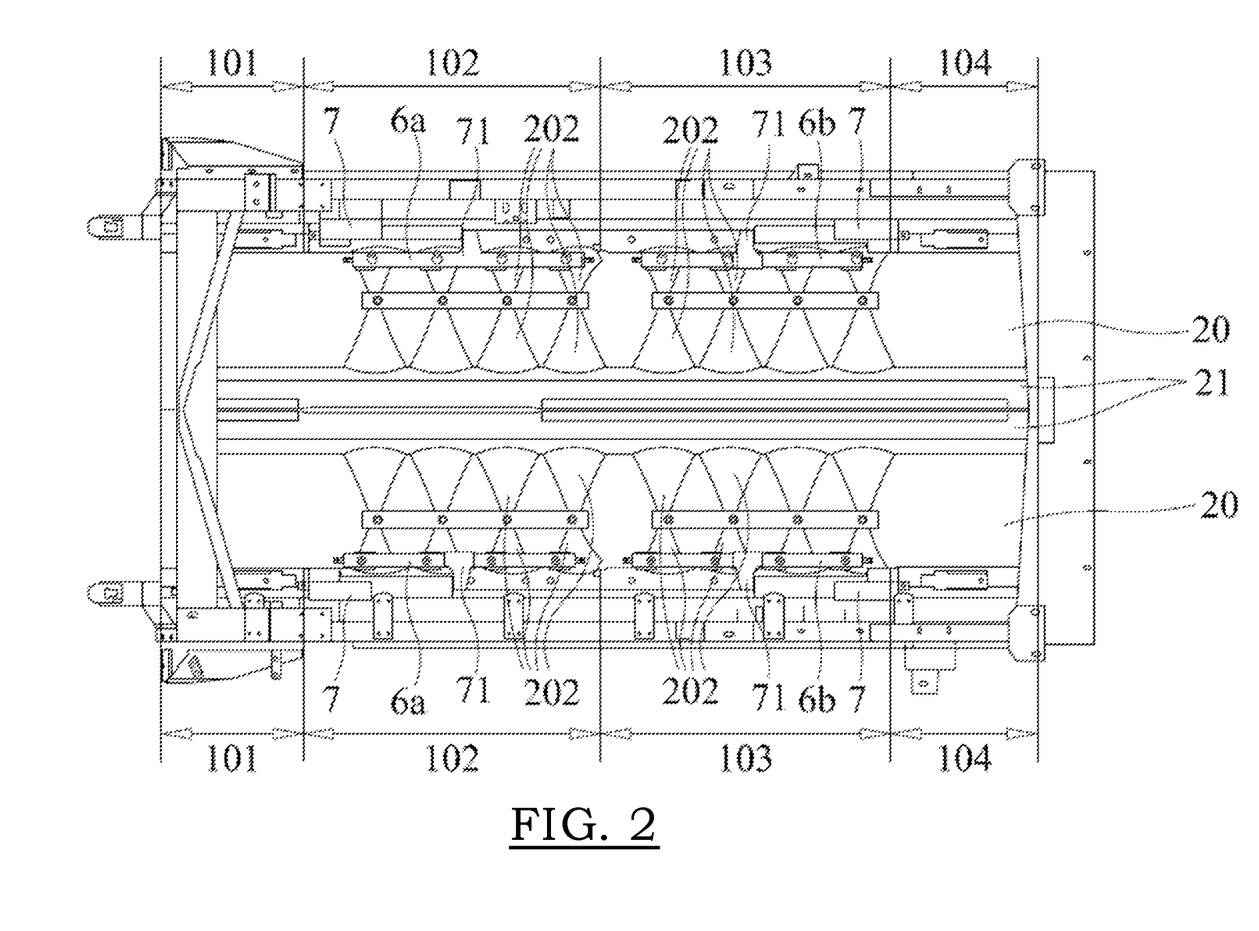
FIG. 2 illustrates a top view of the two top rotor housing cover plates with electrically adjustable vanes as shown in FIG. 1.
Figure 3:
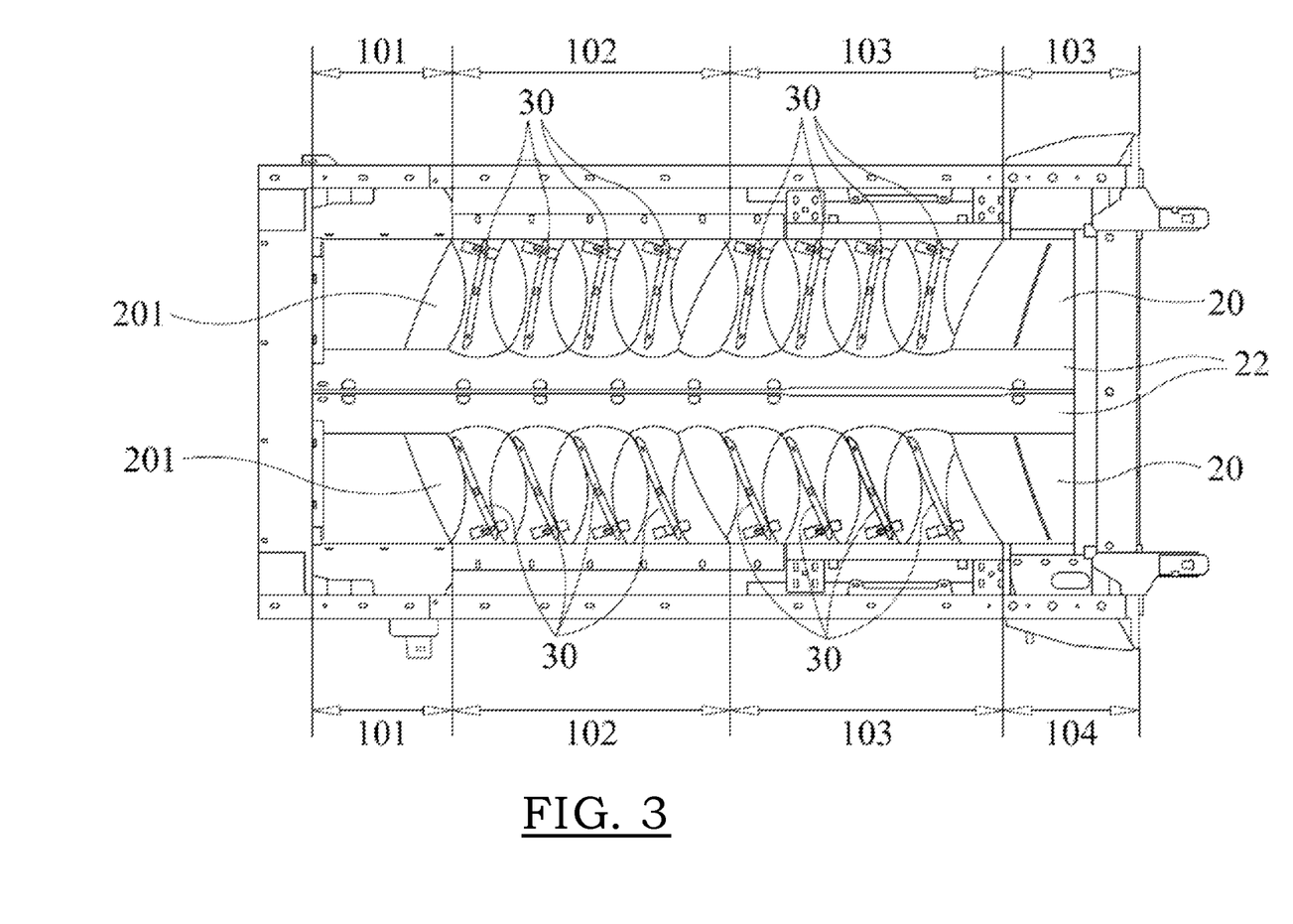
FIG. 3 illustrates an upward view on the inside of the two top rotor housing cover plates with electrically adjustable vanes as shown in FIGS. 1 and 2, wherein the rotors are being removed.

In the FIGS. 1 to 3, a rotor housing assembly (1) (hereafter further called 'assembly') of a twin axial rotor type harvester is shown. As can be seen in these figures, the assembly (1) comprises an infeed section (101) for receiving harvested crop material that was harvested from the field, a threshing section (102) for threshing the harvested crop material received from the infeed section (101), a separating section (103) for separating grain from straw; and an outlet section (104) for discharging the straw out of the assembly (1).

Figure 9:
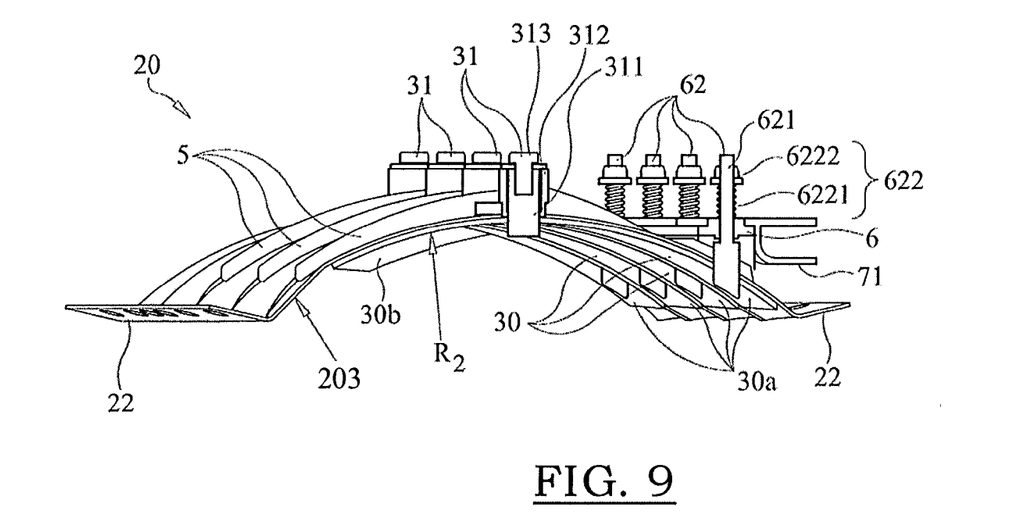
FIG. 9 illustrates a cross section of a section as shown in FIGS. 4 to 7.

In this twin axial rotor type harvester, two generally cylindrical shaped rotor housings (2), one of which is shown in FIG. 9, are arranged side-by-side. Each cylindrical shaped rotor housing (2) extends at least partially around a rotatable rotor (13) (see FIG. 10), the rotor housing (2) having an inner peripheral cylindrical shaped surface (200) and the rotor (13) having an outer peripheral cylindrical shaped surface (300) defining a circumferential gap (4) there between for flow of crop material there through. The rotor (13) includes threshing elements (14) thereabout for passage through the concave gap during rotation of the rotor (13) for threshing and separating grain from the crop material.

It should be noted that the present invention is not limited to twin axial rotor type harvesters, but can also be applied to any type of harvester comprising one or more rotors (3) each with its own rotor housing (2).

Each of these generally cylindrical shaped rotor housings (2) comprises a generally curved top cover plate (20) forming part of a respective generally cylindrically shaped rotor housing (2). As can be seen in FIG. 9, each of these generally cylindrical shaped rotor housings (2) furthermore comprises a generally curved bottom cover plate (21). Also this generally curved shape of these bottom cover plates (21) therewith forms part of a respective generally cylindrically shaped rotor housing (2).

Each of these top cover plates (20) furthermore has a central longitudinal axis (L), and each comprise an inner surface (201) (as can be seen in FIG. 3) which, when mounted, faces the central longitudinal axis (L). This inner surface (201) has a first radius ($R_1$). The inner surface (201) includes at least one first curved section that has the first radius ($R_1$), and at least one second curved section in the form of at least one symmetrically curved shape (202).

Figure 10:
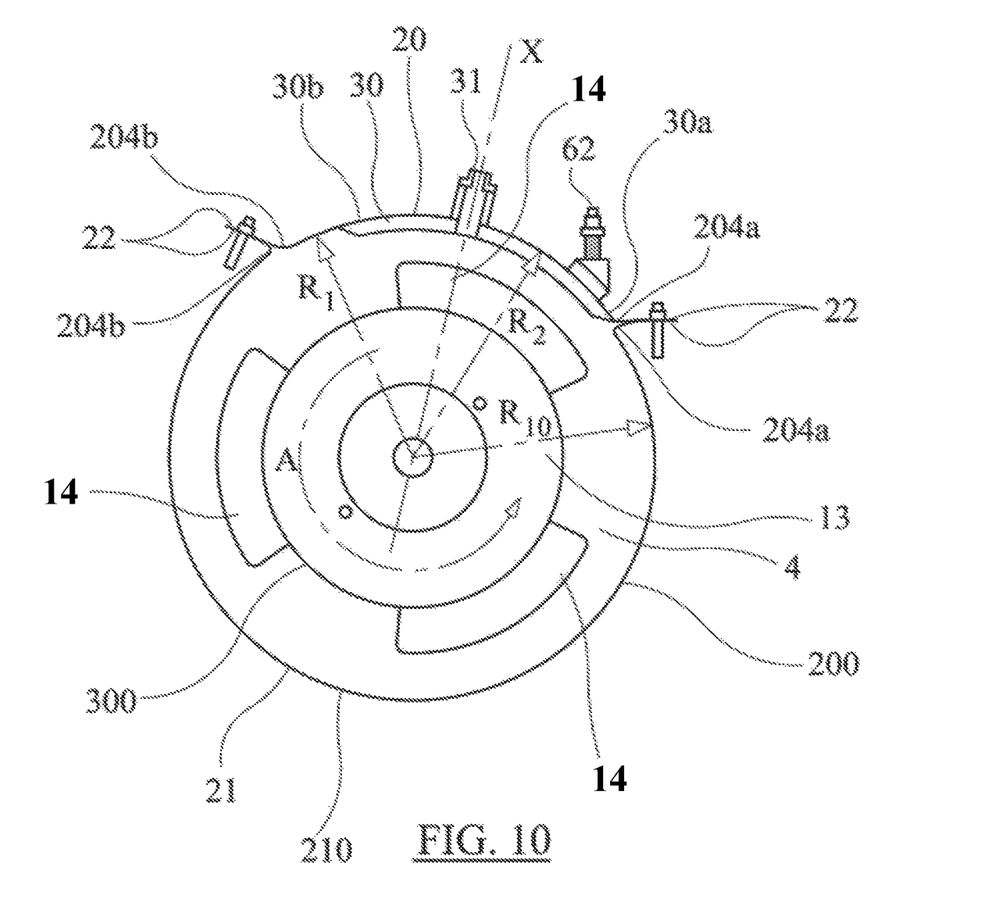
FIG. 10 illustrates a cross section of an axial flow rotor housing with a rotor and a rotor housing assembly according to the invention.

The top cover plate (20) as well as the bottom cover plate (21) at their longitudinal sides (204) are therewith provided with outwardly extending abutting flanges (22) (see FIGS. 1, 4, 5, 7, 8 and 9) such that the top cover plate (20) and the bottom cover plate (21) in their mounted state are abutting against each other and can be connected to each other, for instance by bolting them together. Where the top and bottom cover plate (20, 21) abut against each other, the radius of the inner surface of the cover plate coming first into contact with the flowing crop material is smaller than the radius of the inner surface of the cover plate coming last into contact with the flowing crop material. In the embodiment as shown in FIG. 10, where the cover plates (20, 21) abut (204a, 204b), because of the fact that the crop material flows counter clockwise throughout the circumferential gap (4), the inner surface of the cover plate first coming into contact with the flowing crop material is the inner surface (210) of the bottom cover plate (21) and the inner surface of the cover plate coming later into contact with the flowing crop material is the inner surface (201) of the top cover plate (20). Therefore, where the inner surfaces of the cover plates (20, 21) abut first (see 204a), the inner surface (210) of the bottom cover plate (21) has a third radius (R10) which is smaller than the first radius (R1) of the inner surface (201) of the top cover plate (20). Where the cover plates (20, 21) abut last (see 204b), the inner surface (201) of the top cover plate (20) has a first radius (R1) which is smaller than the third radius (R10) of the inner surface (210) of the bottom cover plate (21).

As can be seen in FIG. 3, each of these top cover plates (20) at the threshing section (102) and the separating section (103) are provided with a vane system (3) at the inner surface (201) thereof. This vane system (3) comprises one or more rotatable vanes (30) which each are rotatably mounted along this inner surface (201) at a rotation point (31).

In the embodiment of an assembly as shown in the figures, the rotation axis (X) of each of the vanes (30) intersects the central longitudinal axis (L) of the generally cylindrical shaped rotor housing (2) (see for instance FIG. 10). This is however not a prerequisite. It is also possible that this rotation axis (X) does not intersect this central longitudinal axis (L) at all. Furthermore, the transversal plane (T) intersects perpendicularly the central longitudinal axis (L). Also this is not a prerequisite. The transversal plane (T) can intersect this central longitudinal axis (L) under another angle of inclination.

Figure 8:
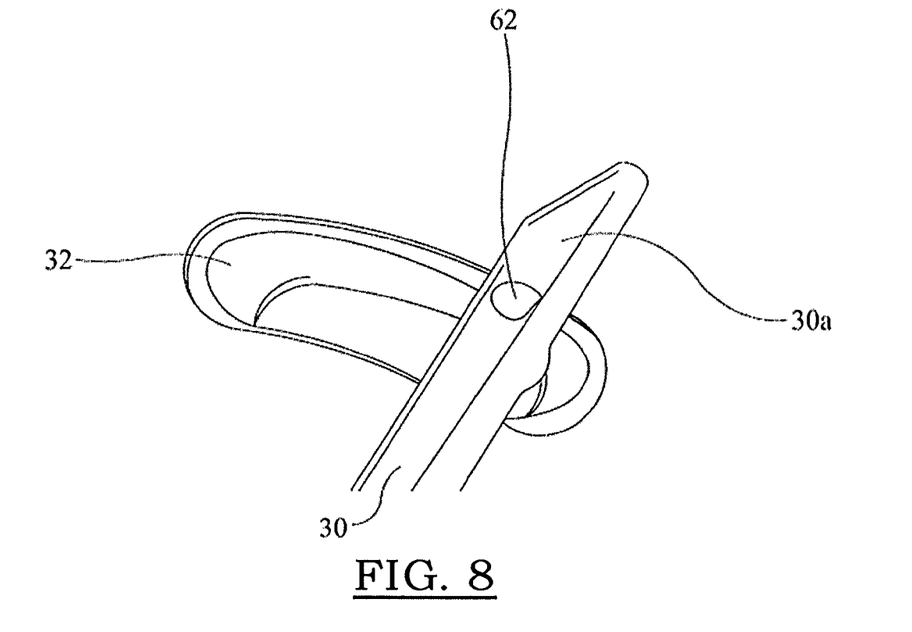
FIG. 8 illustrates a slot with a form sloping outwardly from the outer surface of the top cover plate towards the inner surface of the tope cover plate into which a connection element connecting a vane with a linkage bar is movable.

In order to rotatably mount the one or more vanes (30) along the top cover plate (20), in a preferred embodiment as shown in FIG. 8, per vane, a hub (312) is provided through which a pivot (311) rotatably extends. Each pivot (311) is preferably fixedly connected to the respective vane (30). The underside of the pivot (311) preferably is flat and does not extend further through the respective vane (30) then the lower surface of the respective vane (30) in order to prevent that the flowing crop material would collide with this pivot (311). The pivot (311) is centrally provided with internal screw thread for accommodating a bolt for pulling the respective vane (30) against the inner surface (201) of the top cover plate (20). It is remarked that also other possibilities exist to rotatably mount the vanes (30) on the top cover plate (20).

Figure 6:
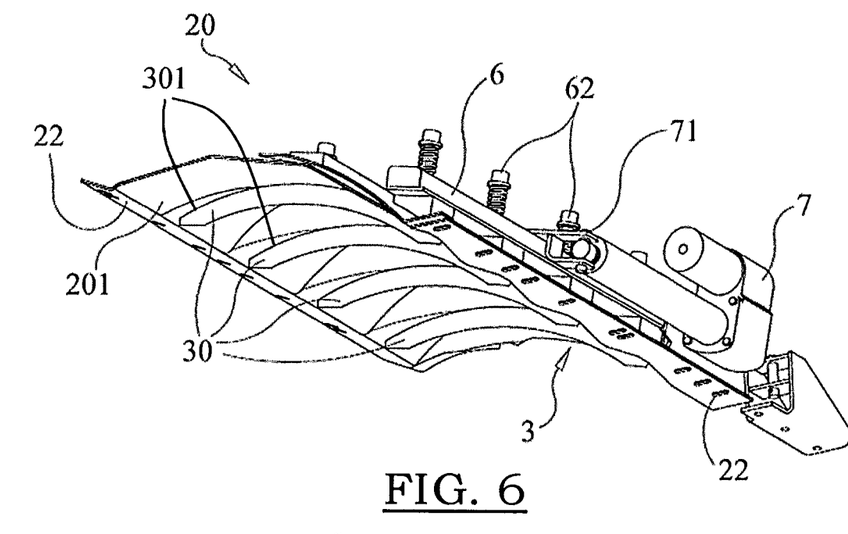
FIG. 6 illustrates a view from below upward of the section as shown in FIG. 5.

The rotatable vanes (30) comprise a contact surface (301) (see FIGS. 6 and 7) with the inner surface (201) of the top cover plate (20), this contact surface (301) having a second radius (R2) that is larger than the first radius (R1) of inner surface (201) of the top cover plate (20).

Figure 7:
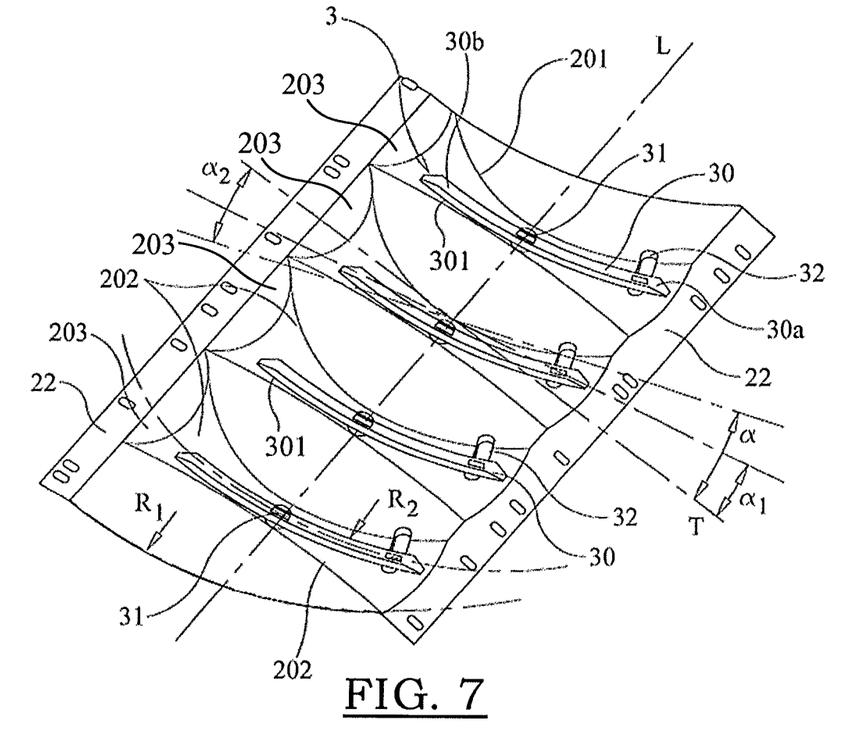
FIG. 7 illustrates a bottom view of the section as shown in FIGS. 4 to 6.

As can be seen amongst others in FIG. 7, per rotatable vane (30), the inner surface (201) of the top cover plate (20) comprises a symmetrically curved shape (202), preferably being executed as a part of a paraboloidal, ellipsoidal or spherical shape, the latter one being the most preferred one, that in a cross-section in a plane (T) transverse on the central longitudinal axis (L) through the rotation point (31) (hereafter further called "the transverse plane") comprises a radius being the same as the second radius (R2) of the contact surface (201) of the rotatable vanes (30). The rotation point (31) can therewith form a tangent point between the general cylindrical shape of the top cover plate (20) and the symmetrically curved shape (202). It is therewith also possible that the rotation point (31) and the tangent point between the general cylindrical shape of the top cover plate (20) and the symmetrically curved shape (202) do not coincide with one another.

The one or more vanes (30) are rotatably mounted around a rotation axis comprising the rotation point (31). The angle (α) of the vanes (30) with respect to the transverse plane (T) is therewith adjustable and the vanes (30) are therewith rotatable between a first position in which the vanes (30) form a first angle (α1) with respect to the transverse plane (T) and a second position in which the vanes (30) form a second angle (α2) with respect to the transverse plane (T). The symmetrically curved shape (202) of the top cover plate (20) has a radius that at each angle (α) that is situated between the first and second angle (α1, α2) is equal to the second radius (R2) of the contact surface (301) of the one or more vanes (30).

As can be seen on FIG. 9, each of the vanes (30) in their longitudinal direction have a downstream end (30a) coming first into contact with the crop material flowing through the rotor housing (2) (see the arrow A on FIG. 10) and an upstream end (30b) coming last into contact with the flow of crop material. As can be seen in FIG. 7, on the side of the top cover plate (20) where the upstream end (30b) of the vane (30) is situated, the symmetrically curved shape (202) comprises a transition zone (203) having a flat surface, preferably in the form of a semi-circular disk, that starts near the upstream end (30b) of the vane (30) and the longitudinally extending side (204b) of the top cover plate (20).

Figure 4:
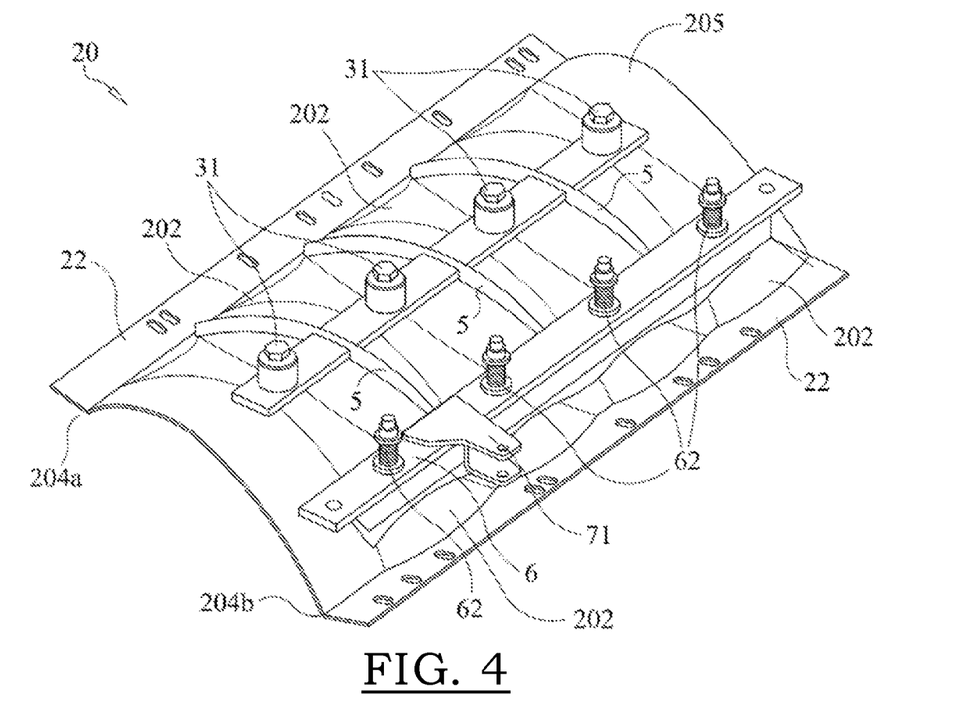
FIG. 4 illustrates a top view of a section of a rotor housing top cover plate with electrically adjustable vanes as shown in FIGS. 1 to 3.
Figure 5:
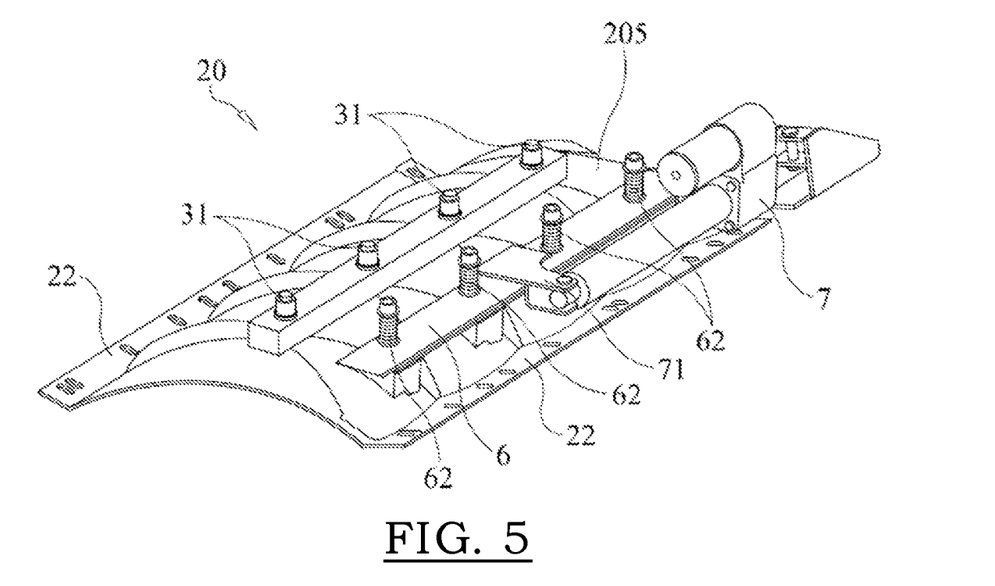
FIG. 5 illustrates a perspective top view of a section of a rotor housing top cover plate with electrically adjustable vanes that are movable by an electrical actuator via a guide bar, the electrical actuator being placed on the right hand side.

As can be seen on FIGS. 1, 4 and 8, on the outer surface (205) of the top cover plate (20), between each two symmetrically curved shapes (202) a reinforcement rib (5) is arranged.

As can be seen in the FIGS. 1, 2, 4, 5 and 6, the vanes (30) of the threshing section (102), respectively the vanes (30) of the separating section (103), at their downstream ends (30a) are connected to a movable linkage bar (6). In this way, the angle (α) of the vanes (30) that are connected with the same movable linkage bar (6) is varied at the same time and these vanes (30) consequently are moved jointly. It is however remarked that it is also possible to connect any different number of vanes (30) to each other using any number of different movable linkage bars (6). It is therewith also a possibility to connect one or more vanes (30) at their upstream ends (30b) to one or more movable linkage bars (6) (not shown in the figures).

As can be seen in the FIGS. 1, 2, 4, 5, 6, 8 and 9, each of the one or more vanes (30) are connected to the linkage bar (6) by means of a respective connection element (62), this preferably at their downstream end (30a). Each of the connection elements (62) are configured to exercise a tearing force onto the one or more vanes (30) tearing the one or more vanes (30) against the inner surface (201) of the cover plate (20). As can be seen on FIG. 7, these one or more connection elements (62) are movable in a slot (32). In the embodiment as shown in the FIGS. 1, 2, 4, 5, 6, 8 and 9, each of these connection elements (62) comprise a pin (621) that extends throughout the respective linkage bar (6), the top cover plate (20) and the respective vane (30). The underside of the pin (621) preferably is flat and does not extend further through the respective vane (30) then the lower surface of the respective vane (30) in order to prevent that the flowing crop material would collide with this pin (621). Each of these connection elements (62) further comprise a tearing system (622) which is configured to apply a tearing force onto the respective vane (30) to tear the respective vane (30) against the inner surface (201) of the top cover plate (20). In the embodiment as shown in the FIGS. 1, 2, 4, 5, 6, 8 and 9, this tearing system (622) comprises a spring (6221), more specifically a coil spring, which is preferably held in its place and under tension by means of a nut (6222) that is bolted on the pin (621) (see FIG. 9). This tearing system (622) is however not limited to the use of a spring system, but can also be executed as a hydraulic, pneumatic, magnetic, etc. system exerting a tearing force onto the respective vane (30) to tear it against the inner surface (201) of the top cover plate (20).

As can be seen in FIGS. 1, 2, 5 and 6, one or more actuator(s) (7) are disposed in connection with one or more vanes (30) through the aforementioned linkage bar(s) (6). A linkage bar (6) is connected to an actuator (7) by means of a connecting piece (71), as can be seen in FIGS. 1, 2, 4, 5, 6 and 8.

In order to measure the load on the one or more vanes (30), as can be seen in FIG. 1, preferably, between the cover plate (20) and the one or more actuators (7), one or more force sensors (8) can be arranged.

It is remarked that in the embodiment of the assembly as shown on the figures, the vane system (3) with all elements as disclosed above are arranged on the top cover plate (20). It would however also be possible to apply the vane system (3) on any other element positioned around the rotor (13) which is part of the rotor housing (2), the latter however not being shown in the figures.

There are different ways to couple the vanes (30) through the linkage bar(s) (6) to the actuator(s) (7). A first possibility as can be seen in FIG. 1, is to dispose one actuator (7) per rotor housing (2) to control the movement of both the vanes (30) of the threshing as well as of the separating section (102, 103). In order to be able to vary the first position of the vanes (30) of the threshing section (102) with respect to the vanes (30) of the separating section (103), or in other words to place the vanes (30) of the threshing section (102) under a different first angle ($\alpha 1$) with respect to the transverse plane (T) in comparison with the vanes (30) of the separating section (103), between the linkage bar (6a) linking the vanes (30) of the threshing section (102) together and the linkage bar (6b) linking the vanes (30) of the separating section (103) together, a coupling piece (61) is arranged. A second possibility as can be seen in FIG. 2, is to dispose an actuator (7) for each linkage bar (6).

The one or more actuators (7) preferably are hydraulic or electric. The one or more actuators (7) preferably are remotely controllable. In this regard, one or more groups of vanes (30) can be remotely controlled, jointly and simultaneously, or in groups of one or more vanes (30), as desired or required for a particular application.

The input device (40) for remotely controlling the one or more actuator(s) (7) preferably is provided at a location remote from these one or more actuators (7), e.g. the operator cabin or platform of the combine harvester, and is connected in operative control thereof, to enable adjustable varying the position of the one or more rotatable vanes (30) remotely as desired. This input device (40) for instance comprises one or more knobs or touch screens which are provided in the operator cabin of the harvester.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A rotor housing assembly for a harvester, comprising
at least one cover plate having a generally curved shape, forming part of a generally cylindrical shaped rotor housing, said at least one cover plate including at least one top cover plate, said at least one top cover plate having a central longitudinal axis, and an outer surface and an inner surface, which, when mounted, said inner surface faces the central longitudinal axis, said inner surface including:
at least one first curved section having a first radius; and
at least one second curved section in the form of at least one symmetrically curved shape, said at least one symmetrically curved shape defining a spherical surface, and said at least one symmetrically curved shape having a radius; and a vane system comprising at least one rotatable vane rotatably mounted along the at least one symmetrically curved shape of the inner surface of the at least one top cover plate at a rotation point, said at least one rotatable vane having a contact surface with the at least one symmetrically curved shape, said contact surface of said at least one rotatable vane having a second radius, said second radius is larger than said first radius of said at least one first curved section of said inner surface, such that, during rotation of the at least one rotatable vane, the contact surface of the at least one rotatable vane substantially follows the at least one symmetrically curved shape and remains in contact with the at least one symmetrically curved shape of the inner surface of the at least one top cover plate.

2. A rotor housing assembly according to claim 1, wherein:
the at least one rotatable vane is rotatable around a rotation axis through the rotation point, and in that, when viewed in a direction along the rotation axis, at least one rotatable vane is rotatably mounted between a first position in which the at least one rotatable vane forms a first angle with respect to a transverse plane through the rotation point and that is transverse on the central longitudinal axis, and a second position in which the at least one rotatable vane forms a second angle with respect to the transverse plane, and wherein said radius of the at least one symmetrically curved shape at each angle that is situated between the first and second angle is equal to said second radius of said contact surface of the at least one rotatable vane.

3. A rotor housing assembly according to claim 1, wherein:
the rotor housing assembly is arranged to allow flow of crop material there-through, wherein the at least one rotatable vane comprises an upstream end coming last into contact with the flow of crop material, and in that the at least one cover plate comprises at least one longitudinally extending side at the side of the at least one cover plate where the upstream end of the at least one vane is situated, wherein, the at least one symmetrically curved shape, comprises a transition zone having a flat surface and starting near the upstream end of the respective vane and ending at the longitudinally extending side of the at least one cover plate.

4. A rotor housing assembly according to claim 3, wherein the transition zone has the shape of a semi-circular disk.

5. A rotor housing assembly according to claim 1, wherein:
the outer surface of said at least one top cover plate is in the form of a generally cylindrical outer surface, wherein on the generally cylindrical outer surface one or more reinforcement ribs are arranged between one or more of the at least one symmetrically curved shapes.

6. A rotor housing assembly according to claim 1, wherein:
the rotor housing assembly furthermore comprises a generally curved bottom cover plate forming part of said generally cylindrically shaped rotor housing and comprising an inner surface having a third radius, wherein, when mounted, the at least one top cover plate and the bottom cover plate abut against each other, and wherein where the cover plates abut, the radius of the inner surfaces of the cover plate coming first into contact with the flowing crop material is smaller than the radius of the inner surface of the cover plate coming last into contact with the flow of crop material.

7. A rotor housing assembly according to claim 1, wherein:
the at least one rotatable vane is connected to one or more movable linkage bars by at least one releasable connection element.

8. A rotor housing assembly according to claim 7, wherein:
the one or more releasable connection elements comprise a tearing system which is configured to apply a tearing force onto the respective vane to tear the one or more vanes against the inner surface of the at least one top cover plate.

9. A rotor housing assembly according to claim 7, wherein:
each of the one or more releasable connection elements are movable in a corresponding slot, each of the slots comprising a wall sloping outwardly from the outer surface towards the inner surface of the at least one top cover plate.

10. A rotor housing assembly according to claim 7, wherein a first set of vanes are connected to a first linkage bar and a second set of vanes are connected to a second linkage bar, the first and second linkage bar being connected to one another by means of a coupling piece in order to allow to vary the first position of the first set of vanes with respect to the first position of the second set of vanes.

11. A rotor housing assembly according to 7, wherein the one or more linkage bars are connected to one or more actuators which are adapted to move the linkage bar(s).

12. A rotor housing assembly according to claim 11, wherein:
between the at least one cover plate and the one or more actuators, a force sensor is provided that is arranged to measure the load on the one or more vanes.

13. A rotor housing assembly according to claim 1, wherein the rotor housing assembly comprises a controller adapted to measure the effect of the position of the one or more vanes on fuel consumption, rotor and sieve losses, programmed to set the position of the vane(s) in optimal position on the go in function of the harvesting conditions.

14. A harvester comprising:
a rotor housing assembly for a harvester comprising at least one cover plate having a generally curved shape, forming part of a generally cylindrical shaped rotor housing, said at least one cover plate including at least one top cover plate, said at least one top cover plate having a central longitudinal axis, and an outer surface and an inner surface, which, when mounted, said inner surface faces the central longitudinal axis, said inner surface including:
at least one first curved section having a first radius; and
at least one second curved section in the form of at least one symmetrically curved shape, said at least one symmetrically curved shape defining a spherical surface, and said at least one symmetrically curved shape having a radius; and a vane system comprising at least one rotatable vane rotatably mounted along the at least one symmetrically curved shape of the inner surface of the at least one top cover plate at a rotation point, said at least one rotatable vane having a contact surface with the at least one symmetrically curved shape, said contact surface of said at least one rotatable vane having a second radius, said second radius is larger than said first radius of said at least one first curved section of said inner surface, such that, during rotation of the at least one rotatable vane, the contact surface of the at least one rotatable vane substantially follows the at least one symmetrically curved shape and remains in contact with the at least one symmetrically curved shape of the inner surface of the at least one top cover plate.

15. A harvester according to claim 14, wherein the harvester comprises an input device to remotely control one or more actuators operably connected to said at least one rotatable vane.

16. A harvester according to claim 14, wherein:
the at least one rotatable vane is rotatable around a rotation axis through the rotation point, and in that, when viewed in a direction along the rotation axis, at least one rotatable vane is rotatably mounted between a first position in which the at least one rotatable vane forms a first angle with respect to a transverse plane through the rotation point and that is transverse on the central longitudinal axis, and a second position in which the at least one rotatable vane forms a second angle with respect to the transverse plane, and wherein said radius of the at least one symmetrically curved shape at each angle that is situated between the first and second angle is equal to said second radius of said contact surface of the at least one rotatable vane.

17. A harvester according to claim 14, wherein:
the rotor housing assembly is arranged to allow flow of crop material therethrough, wherein the at least one rotatable vane comprises an upstream end coming last into contact with the flow of crop material, and in that the at least one cover plate comprises at least one longitudinally extending side at the side of the at least one cover plate where the upstream end of the at least one vane is situated, wherein, the at least one symmetrically curved shape comprises a transition zone having a flat surface and starting near the upstream end of the respective vane and ending at the longitudinally extending side of the at least one cover plate.

18. A harvester according to claim 17, wherein:
the transition zone has the shape of a semi-circular disk.

19. A rotor housing assembly according to claim 2, wherein:
said rotation axis being located on a point of tangency between said first radius and said second radius of said at least one symmetrically curved shape.

20. A harvester according to claim 16, wherein:
said rotation axis being located on a point of tangency between said first radius and said second radius of said at least one symmetrically curved shape.

* * * * *